INVENTOR.
JOHN T. BAYLOR
BY Carl R. Brown
Attorney

Dec. 24, 1968 J. T. BAYLOR 3,418,655
PSEUDO-COHERENT RANGE RATE SYSTEM
Filed Sept. 12, 1966 2 Sheets-Sheet 2

INVENTOR.
JOHN T. BAYLOR
BY Carl R. Brown
Attorney

United States Patent Office 3,418,655
Patented Dec. 24, 1968

3,418,655
PSEUDO-COHERENT RANGE RATE SYSTEM
John Thomas Baylor, San Diego, Calif., assignor to Cubic Corporation, San Diego, Calif., a corporation of California
Filed Sept. 12, 1966, Ser. No. 578,531
9 Claims. (Cl. 343—6.5)

ABSTRACT OF THE DISCLOSURE

A range rate system for determining the radial range of a moving object with respect to the point of origin of transmitted radio signals wherein a transponder transmits to a receiving station a signal comprising a received transmitted signal mixed with a second frequency that is modulated by a third frequency that is the second frequency divided by a given integral number other than 1. The receiver station detects the modulating frequency and thus detects the second frequency of the transponder by multiplying the modulating frequency by the given integral number. The transponder transmitted signal is mixed with the detected second frequency at the receiver station and this signal is then mixed with the detected second frequency at the receiver station and this signal is then mixed with the transmitted frequency to obtain the Doppler information.

---

This invention relates to a range rate system for determining the radial range rate of a moving object with respect to the point of origin of transmitted radio signals. More particularly, the present invention is concerned with a system of the type employing a transponder and is specifically directed to a pseudo-coherent range rate system which obviates many of the most troublesome disadvantages of comparable range rate systems of the prior art.

When it is desired to determine the range rate or radial velocity of an airborne object, for example, such as a missile, satellite or similar target, many prior art systems have employed transponders carried by the moving object to which a signal originating at a ground station is transmitted. The transponder in turn re-transmits the signal which it receives but in another form, and upon reception of the return signal at the ground station, the range rate may be computed from successively determined changes of distance between the moving object and the transmitter station located on the ground.

The use of a transponder requires that the signal received at the moving object be operated upon so that it is off-set in frequency before being re-transmitted to the ground transmitting station in order to prevent oscillation of the transponder. In range rate systems employing transponders, a high degree of precision is required in order that the velocity of the moving object be correctly determined. This implicitly requires that the amount by which the received frequency is off-set by the transponder be known or determinable to an extremely high order of accuracy at the ground transmitting station. In many prior art systems of the type broadly alluded to above, one common method used to insure the requisite precision depended upon locking the amount of off-set frequency to the frequency of the ground transmitted signal. This concept, while sound in theory, is in fact a relatively highly complicated design to implement, difficult to stabilize in operation, and also imposes limitations upon the number of available frequencies which may be employed because the off-set frequency must be harmonically related to the frequency received at the moving object.

Accordingly, it is a primary object of the present invention to provide a range rate system employing a transponder in a moving object which obviates many of the inherent disadvantages of comparable prior art systems.

An equally important object of the present invention is to provide such a range rate system which does not require that the off-set frequency generated at the transponder be locked with the frequency of the ground transmitting station.

A further object of the present invention is to provide such a range rate system in which the transponder can employ a relatively less precisely stabilized source of reference frequency signals without impairing the precision of operation of the system.

A further object of the present invention is to provide a range rate system of the type described which can be embodied in transponders of both demodulating and non-demodulating types.

It is a further object of the present invention to provide such a range rate system which, in addition to being greatly simplified and highly precise, is capable of generating a useful signal input for distance measuring equipment as well as signal information from which range rate can be accurately determined.

In its fundamental form, the present invention comprises a psuedo-coherent range rate system having an originating transmitter which may be located at a ground station, for example, and which is capable of sending a signal at a first frequency for reception by a moving object or station such as a missile or satellite. The moving object or station includes a transponder in which there is an appropriate means for generating a second frequency. Within the transponder, a mixer means is adapted to receive the first frequency as transmitted from the ground station and received by the moving object, together with the second frequency to develop a third form of signal. A frequency divider in the transponder is employed for dividing the second frequency by an integral number, which is required to be greater than one. The transponder also incorporates a modulating means which is adapted to receive the divided frequency and the composite output from the mixer so that the mixer output becomes modulated by the divided frequency. Appropriate means are also provided in the transponder for re-transmitting the modulated signal thus developed so that it is radiated from the transponder back to the originating transmitter which may be at a ground station as explained previously.

A receiver is associated with the originating transmitter and is arranged to receive the modulated signal which is re-transmitted from the transponder. The ground receiver includes means for multiplying the received modulated signal by the integral number previously referred to in describing the frequency divider means of the transponder. After such multiplication, the resultant received multiplied modulation is mixed with the first frequency signal which was initially transmitted from originating transmitter. Thus, there is developed a signal containing Doppler intelligence which is indicative of the instantaneous distance and range rate of the moving station relative to the originating transmitter.

The signal developed at the ground station may be expressed by terms of a mathematical function. One of the terms of the function representing the signal developed at the ground station in the foregoing manner, is a two-way Doppler signal which may be measured, and in accordance with the concept of the present invention, the other term of the function representing such signal contains information useful as the input to distance measuring equipment of well known and conventional type.

Accordingly, by reason of the concept of the present invention, the ground station is capable of reconstructing the amount of off-set frequency between the originally transmitted signal received at the transmitter and that frequency developed by its local oscillator or other source of the second frequency, which reconstruction is effected by multiplying the received modulation by a known amount. The known integral multiplying factor is the same as the integral number of divisions which the second frequency undergoes in the transponder before the divided frequency is employed to modulate the received signal for re-transmission to the ground station.

An alternative arrangement within the transponder may be employed to equivalently implement the concept of the present invention. Comparable performance may be achieved by providing a local oscillator for generating a signal in the transponder which is not harmonically related to the received signal and multiplying the frequency of the local oscillator by a pre-determined integral number greater than one to produce a signal differing from the received signal by a known or determinable amount.

Further, the present invention may employ a reference oscillator of fixed frequency or a controllable frequency source such as a voltage controlled oscillator. In the latter case, where a voltage controlled oscillator is employed, the reference oscillator frequency is counted down or divided and locked to one of the distance measuring equipment ranging tones. This, in turn, as will be appreciated by those skilled in the art, effectively locks the transmitted frequency off-set to a multiple of the ranging tone. Thus, there is provided an inherent reference for determination of the amount of Doppler shift on the return carrier, which can be employed for distance measuring equipment purposes.

Accordingly, the concept of the present invention insures that any change in the frequency received at the transponder produces a compensating commensurate change in the transponder source of its secondary frequency which preserves the Doppler information. A modulation of the transponder source of second frequency signals can be either amplitude modulation or angle modulation and can also be accomplished either before or after the signal is impressed upon the first mixer.

These and other features and advantages and objects of the present invention will be better understood from the following disclosure and description of several embodiments of the present invention together with the accompaning drawings and its scope will be pointed out in the appended claims.

Figure 1:
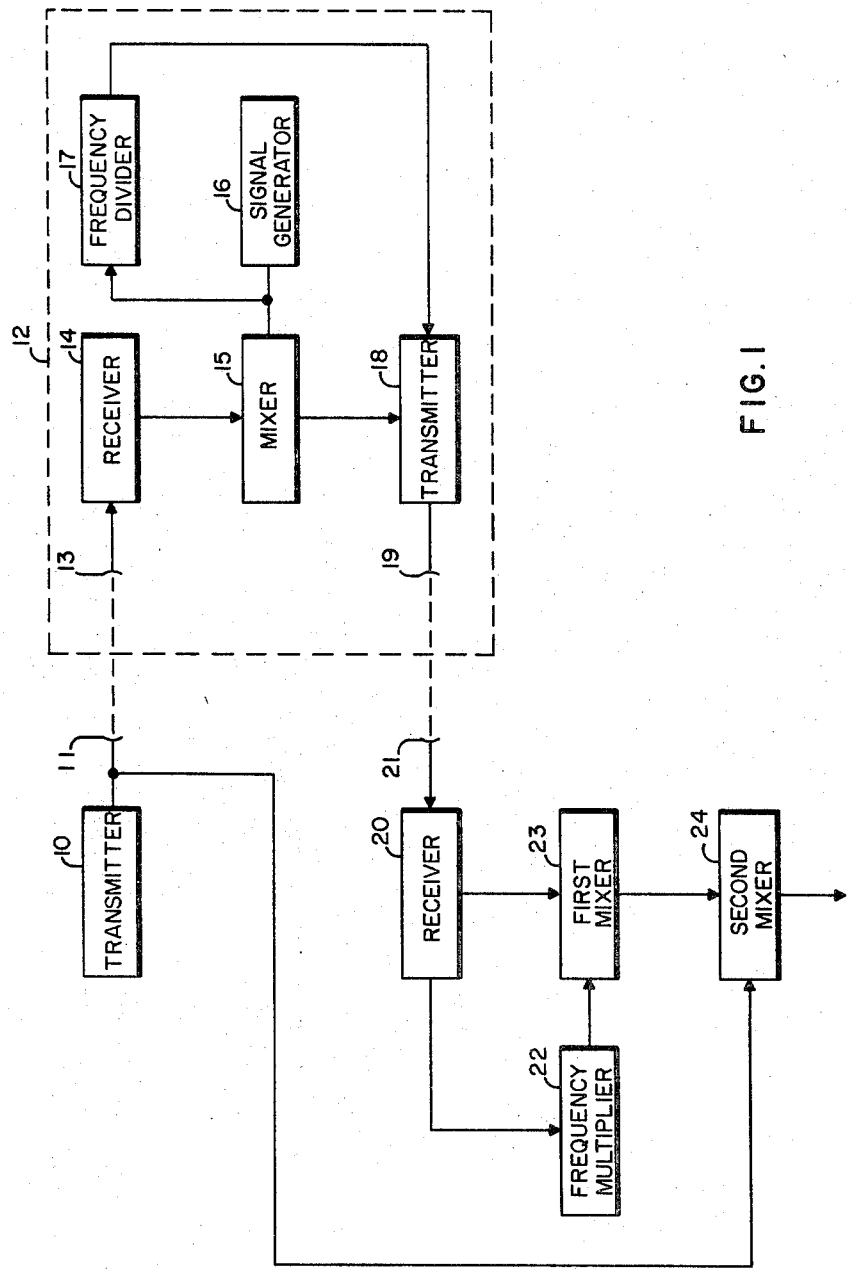
FIGURE 1 is a schematic block diagram of an embodiment of the pseudo-coherent range rate system of the present invention.

Referring now to FIGURE 1, there is shown a schematic block diagram of a pseudo-coherent range rate system embodying the concept of the present invention. A transmitter 10 of conventional design is connected to an antenna 11, which radiates a signal at a first frequency designated as $f_1$ for convenience of identification. The signal $f_1$ is received at a moving object which includes a transponder as indicated generally at 12. The transponder means 12 includes a receiving antenna 13 which is connected to feed the signal which it develops to a receiver 14. The receiver 14 is in turn connected to a mixer means 15. A signal generator 16 which develops a signal at a second frequency $f_2$ is also connected to impress its input on the mixer 15. Thus, the mixer 15 receives two signals, one of which may be expressed by the term $$f_1\left(1+\frac{v}{c}\right)$$

where $v$ is the radial velocity of the moving object carrying the transponder 12, and $c$ is the speed of light. The second frequency, of course, is the $f_2$ signal generated by the signal generator 16. Thus, the output of the mixer 15 may be expressed as $$f_1\left(1+\frac{v}{c}\right)-f_2$$

The second frequency $f_2$ output of the signal generator 16 is also fed to a frequency divider 17 which is adapted and arranged to divide the frequency $f_2$ by an integral number greater than one. Thus, the output of the frequency divider 17 is a sub-harmonic of the second frequency $f_2$, which may be expressed as $f_2/N$, where N is an integer greater than one.

The sub-harmonic of the $f_2$ frequency is fed to a transmitter 18 which also receives the output of the mixer 15. The transmitter 18 includes appropriate modulating means arranged to operate so that the output of the mixer 15 is modulated by the frequency $f_2/N$. The signal thus modulated is connected to an appropriate antenna 19 and re-transmitted to a ground receiver 20 of conventional state of the art type. An antenna 21 develops the signal input to the receiver 20 and after suitable amplification and detection in the receiver 20, the received modulation signal is multiplied in a multiplier 22. The multiplication factor is the same integer "N" as was previously mentioned in connection with the operation of the frequency divider 17.

The received signal thus mutliplied in the frequency multiplier 22 is fed to a mixer 23 where it is mixed with the signal developed at the antenna 21 and amplified by the receiver 20. The output of the mixer 23 accordingly may be expressed as $$f_1\left(1+\frac{2v}{c}\right)$$

This signal is in turn connected to a second mixer 24 which also receives the originally transmitted signal $f_1$ from the transmitter 10. After undergoing mixing these two signals provide a composite signal including the term $$f_1+\frac{2v}{c}$$

This will be recognized as the two-way Doppler signal developed by the transmission of signals from the ground station to the transponder 12 and their return to the ground station. It is readily demonstrable that this signal is a function of the velocity, i.e., range rate, of the moving station carrying the transponder 12 relative to the ground station or the originating transmitter 10.

Those skilled in the art will recognize that in the operation of the present system there are two signals generated which may be expressed as $$f_1\frac{2v}{c}+f_2\left(1+\frac{v}{c}\right)$$

As was previously mentioned, the first term of this expression is the two-way Doppler signal which is to be measured and the second term contains one-way Doppler information. The second term can be detected by multiplying by the known factor and mixing in accordance with the teaching of the present invention. A preferred method may be to count the composite signal expressed by the two terms given above and also the recovered or detected second frequency $f_2$. This would assure that the frequencies so counted do not go through zero frequency for any condition of operation of the system.

Those who are knowledgable in the art of transponder range rate systems will readily recognized that inherent in the operation of the system of the present invention is a unique transponder operative concept. The requisite operative characteristics of this transponder concept may be implemented in a number of ways. One type may be referred to as a non-demodulating transponder and another type may be referred to for convenience as a demodulating type of transponder.

Figure 2:
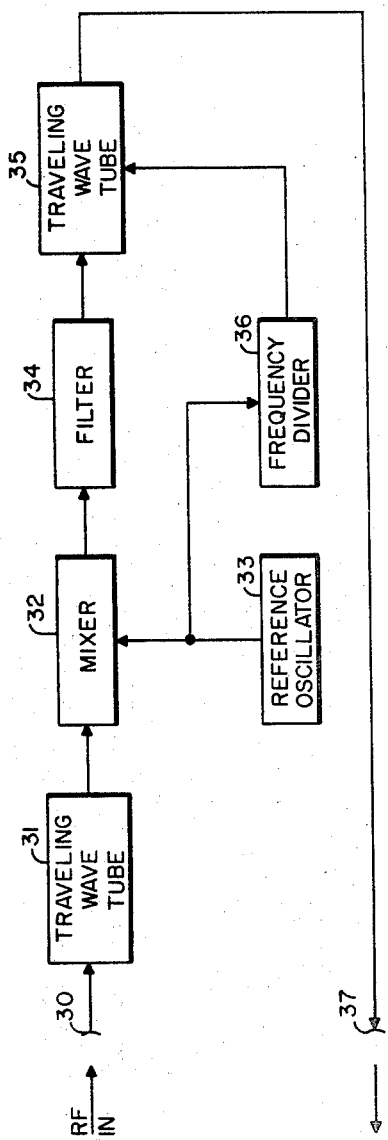
FIGURE 2 is a schematic block diagram of a non-demodulating rate transponder which may be used in the pseudo-coherent system of the present invention.

FIGURE 2 illustrates an embodiment of a non-demodulating type of transponder including the unique concept of the present invention. In FIGURE 2 the signal from the originating transmitter at the ground station is received at an antenna 30 and the signal which is developed is impressed upon an appropriate amplified such as the traveling wave tube 31. The output of the traveling wave tube 31 is impressed upon a mixer 32. The second signal referred to the mixer 32 is the output $f_2$ of the reference oscillator 33. The mixer 32 produces an output which may be expressed by the term $$f_1\left(1+\frac{v}{c}\right)-f_2$$

That signal is appropriately filtered in a filter 34 and impressed upon a second traveling wave tube 35 for amplification. The output $f_2$ of the reference oscillator 33 is also fed to a frequency divider 36 where it undergoes a division in frequency by an integral number which is greater than one. Thus the output of the frequency divider 36 may be expressed as $f2/N$. The traveling wave tube 35 operates as a phase modulating device by employing the well known technique of impressing the modulating frequency $f2/N$ on the helix of the traveling wave tube 35. Thus, the output of the traveling wave tube 35 may be expressed as $$f_1\left(1+\frac{v}{c}\right)-f_2$$

all modulated by $f2/N$. This latter signal is fed to an antenna 37 for re-transmission to the ground station and is then operated upon in a manner similar to that described in connection with the operation of the system disclosed and illustrated by FIGURE 1.

Figure 3:
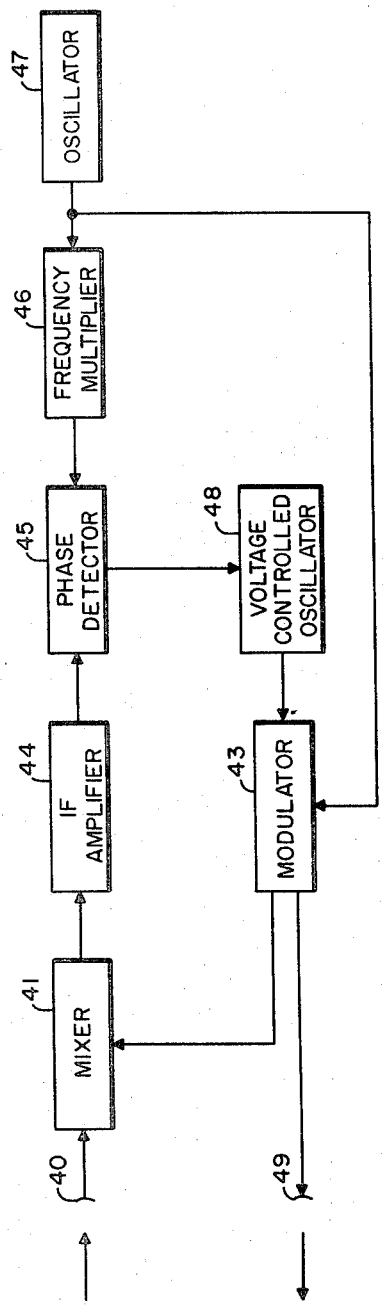
FIGURE 3 is a schematic block diagram of a demodulating transponder which may be used in the pseudo-coherent range rate system of the present invention.

FIGURE 3 illustrates in schematic block diagram form what may be described as a demodulating type of transponder of the pseudo-coherent range rate system of the present invention. The signal radiated by the originating transmitter at the ground station is received at the demodulating transponder of FIGURE 3 by an antenna 40. Because of the velocity of the moving object such as a missile or satellite, which carries the transponder, the ground station signal of frequency $f_1$ develops a signal at the antenna 40 which may be expressed as $$f_1\left(1+\frac{v}{c}\right)$$

Accordingly, the signal at the antenna 40 which is fed to an appropriate mixer means 41 is in the modified form of the foregoing term. The mixer 41 also receives a signal from a modulator 43 to develop an IF signal. The IF signal is appropriately amplified in an IF amplifier 44 which feeds its output to a phase detector 45.

The phase detector 45 performs the function of producing an output signal commensurate with the phase difference as detected between two input signals, one being the output of the IF amplifier 44 and the other being $f_2$ as received from a frequency multiplier 46. The frequency multiplier 46 is arranged to multiply its input signal by a factor N, operating upon a signal of frequency $f2/N$ received from an oscillator 47.

The ouput frequency $f2/N$ of oscillator 47 is also fed to a modulator 43 which receives a second signal in the form of the output of a voltage controlled oscillator 48. The frequency of the output signal of the voltage controlled oscillator varies in response to the output signal of the phase detector 45 which is impressed upon it; the output signal of the voltage controlled oscillator 48 may be expressed by the term $$f_1\left(1+\frac{v}{c}\right)-f_2$$

This latter signal, when fed to the modulator 43, is modulated by $f2/N$ so that the output signal of modulator 43 may be expressed as $$\left[f_1\left(1+\frac{v}{c}\right)-f_2\right]$$

all modulated by $f2/N$; this final form of transponder signal is fed to an antenna 49 for re-transmission to the ground station. Thus, it will be seen that the output of the demodulating type transponder illustrated by FIGURE 3 is substantially that of the non-demodulating transponder as illustrated by FIGURE 2 and that both such described transponders operate in accordance with the concept of the present invention to provide a signal containing information as to the Doppler effect which is indicative of range rate. Accordingly, regardless of whether the non-demodulating or the demodulating transponder is employed as conceived by the present invention the site of the originating transmitter receives a return signal from the transponder of the remote moving vehicle which may be expressed by the term $$f_1\left(1+\frac{2v}{c}\right)-f_2\left(1+\frac{v}{c}\right)$$

As was previously explained, this form of signal contains the two-way Doppler information in the first term as well as one-way Doppler information in the second term; can be employed for developing intelligence through the use of state of the art distance measuring equipment of conventional type.

Those skilled in the art will appreciate that the concept of the present invention may be embodied in other arrangements of equipments in addition to those specific embodiments disclosed in FIGURES 1, 2 and 3 as may be desired or necessary by a particular application. Inherent in the unique concept of the present invention, however, is the highly desirable feature of eliminating and obviating the requirement for an extremely high degree of stability in the frequency source employed in the transponder.

Additionally, as a necessary consequence of the lack of requirement for a highly stable oscillator, the transponder equipment may be greatly simplified without significant loss of reliability or accuracy in operatively detecting the range rate of a moving object such as a missile, satellite, or other vehicle.

Moreover, in order to prevent the loss of Doppler frequency information, it may be desirable to employ a transponder of the type illustrated in FIGURE 3, where the signal generated by the local oscillator is also the outgoing frequency. As shown in that arrangement, any change in the frequency of the incoming signal will produce a commensurate compensating change in the frequency of the signal generated by the local oscillator thus preserving the initial one-way Doppler information. Modulation of the local oscillator may be accomplished by either amplitude modulation or angle modulation and can be performed either before or after the signal is fed to the first mixer of the arrangement of equipment illustrated in FIGURE 3.

The ground station referred to hereinbefore need not be a stationary transmitting point but may be a moving vehicle such as a surface vessel or aircraft and well known techniques can be applied within the spirit and scope of the present invention to compensate for that portion of the Doppler effect due to movement of the originating transmitter.

Accordingly, the present invention is a significant improvement over known prior art systems, having highly advantageous features and performance characteristics as embodied in the transponders employed as well as the overall system concept which necessarily embraces the uniquely operative transponder sub-systems.

I claim:
1. A pseudo-coherent range rate system comprising:
   an originating transmitter for sending a signal at a first frequency for reception by a moving station having a transponder;
   signal generating means in said transponder for producing a second frequency signal and a second frequency harmonic signal at a predetermined integral frequency multiple thereof;
   transponder mixer means for mixing said second frequency signal with the first frequency signal received at said transponder;
   transponder modulating means for modulating the output signal of said mixer means by said second frequency harmonic signal;
   means for transmitting said modulated signal from said transponder to said originating transmitter;
   a receiver associated with said originating transmitter and arranged to receive said modulated signal;
   said receiver including means for multiplying the received modulated signal by said predetermined integral frequency multiple and mixing the resultant multiplied received signal with said first frequency signal from said originating transmitter; and
   whereby to produce a signal containing Doppler intelligence indicative of the range rate of said moving station relative to said originating transmitter.

2. A pseudo-coherent range rate system as defined in claim 1 wherein said signal generating means in said transponder includes a source of said second frequency signal and a frequency divider for dividing said second frequency signal by said predetermined integral frequency multiple.

3. A pseudo-coherent range rate system as defined in claim 1 wherein said signal generating means in said transponder includes a source of said second frequency harmonic signal and frequency multiplier means for multiplying said harmonic signal by said predetermined integral frequency multiple.

4. A pseudo-coherent range rate system as defined in claim 1 wherein said transponder mixer means produces a single sideband output.

5. A pseudo-coherent range rate system as defined in claim 4 wherein said transponder mixer means produces a single sideband signal containing no significant components of the first frequency.

6. A pseudo-coherent range rate system as defined in claim 1 wherein said second frequency and said predetermined integral frequency multiple are such that said second frequency signal and the frequency of said modulated signal received from said transponder do not go through zero frequency for any operative condition of said system.

7. A transponder for use in a pseudo-coherent range rate system comprising:
   a signal generating means for producing a fundamental frequency signal and a hormonic signal at a predetermined integral frequency multiple;
   said fundamental frequency signal differing from the frequency of a received signal by a known amount;
   mixer means for mixing said fundamental frequency signal with said received signal;
   modulating means for modulating the output of said mixer means by said harmonic signal; and
   means for re-transmitting said modulated signal.

8. A transponder for use in a pseudo-coherent range rate system comprising:
   a local oscillator for generating a signal of a frequency differing from the frequency of a received signal by a known amount;
   means for mixing said signals to produce an output signal;
   means for dividing said local oscillator signal by a predetermined integral number greater than one;
   means for modulating said output signal by said divided local oscillator signal; and
   means for re-transmitting said modulated signal.

9. A transponder for use in a pseudo-coherent range rate system comprising:
   a local oscillator for generating a signal which is not harmonically related to a received signal;
   frequency multiplier means for multiplying said local oscillator signal by a predetermined integral number greater than one for producing an output signal differing in frequency from said received signal by a known amount;
   mixer means for mixing said received signal and the output signal of said frequency multiplier;
   means for modulating the output of said mixer means by the output signal of said local oscillator; and
   means for re-transmitting said modulated signal.

References Cited
UNITED STATES PATENTS

| | | | |
|---|---|---|---|
| 2,950,473 | 8/1960 | Gutton et al. | 343—6.5 |
| 3,079,557 | 2/1963 | Crabtree | 343—6.8 X |
| 3,197,769 | 7/1965 | Roth | 343—6.5 |
| 3,226,714 | 12/1965 | Applegarth | 343—6.8 |
| 3,290,677 | 12/1966 | Jacob | 343—6.8 X |

RODNEY D. BENNETT, *Primary Examiner.*

MALCOLM F. HUBLER, *Assistant Examiner.*

U.S. Cl. X.R.

343—6.8